May 5, 1942.   J. A. SWAN   2,281,639
FLIXI-BAR ROTOR-TYPE LAWN MOWER
Filed March 21, 1941   2 Sheets-Sheet 1

Inventor,
JAMES A. SWAN.
By E. E. Vrooman & Co.
His Attorneys

May 5, 1942.   J. A. SWAN   2,281,639
FLIXI-BAR ROTOR-TYPE LAWN MOWER
Filed March 21, 1941   2 Sheets-Sheet 2
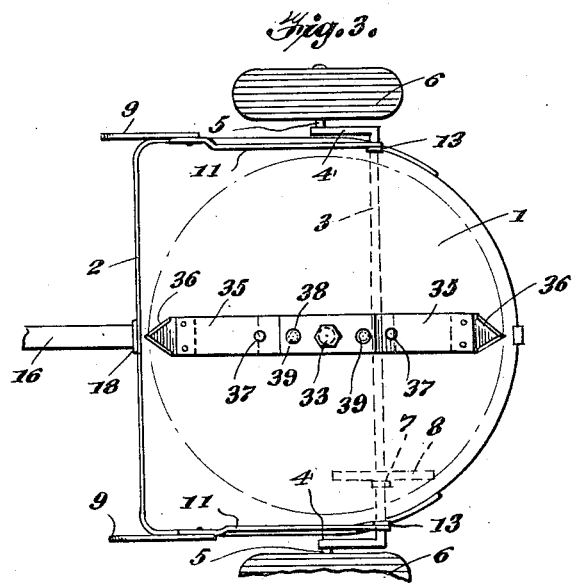
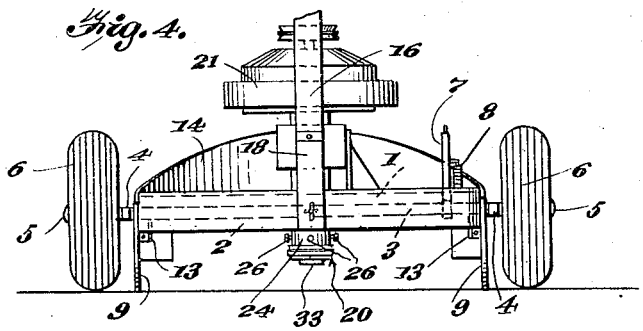
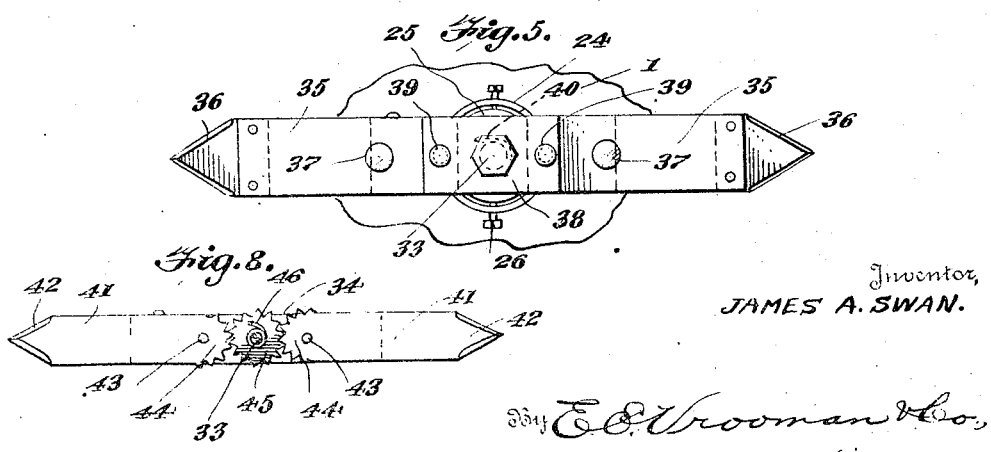
Inventor,
JAMES A. SWAN.

Patented May 5, 1942

2,281,639

UNITED STATES PATENT OFFICE 2,281,639

FLIXI-BAR ROTOR-TYPE LAWN MOWER

James Arthur Swan, Springfield, Mo.

Application March 21, 1941, Serial No. 384,573

6 Claims. (Cl. 56—25.4)

This invention relates to lawn mowers and it is one object of the invention to provide a lawn mower which is powered by a motor mounted upon a carriage that its shaft extends vertically with its lower portion projecting downwardly from the carriage and carrying rotary cutting means operating in a horizontal plane so that as the mower is propelled forwardly the rotary cutter will serve very effectively to cut grass over which the mower moves.

Another object of the invention is to provide the mower with a carriage including wheels carried by an axle so mounted that the carriage may be vertically adjusted and the cutting blades disposed in predetermined vertical spaced relation to the ground. It will thus be seen that the cutters may be so adjusted that the stand of grass may be of predetermined depth after being mowed.

Another object of the invention is to so mount arms carrying the cutting blades that they may yield when the blades strike stones or other obstructions and thus prevent the blades from being broken or otherwise damaged.

Another object of the invention is to so connect the blade-carrying arms that when one is moved out of its normal position by its blade striking an obstruction or encountering extra tough grass the other arm will also be moved to a position in which proper balance between the blades will be maintained.

Another object of the invention is to provide improved means for turning the motor shaft and setting the motor in operation.

Another object of the invention is to provide a lawn mower which is simple in construction, easy to operate, and not liable to get out of order.

The invention is illustrated in the accompanying drawings wherein

Figure 3 is a bottom plan view with portions omitted for sake of clearness.

Figure 4 is a view showing the improved mower in rear elevation.

Figure 5 is a view showing the cutter bar upon an enlarged scale in bottom plan.

Figure 8 is a plan view of a modified form of cutter.

Figure 1:
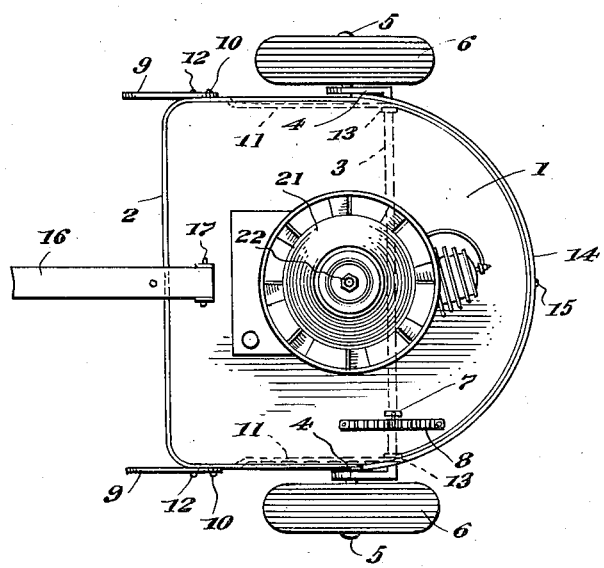
Figure 1 is a top plan view of the improved mowing machine.
Figure 2:
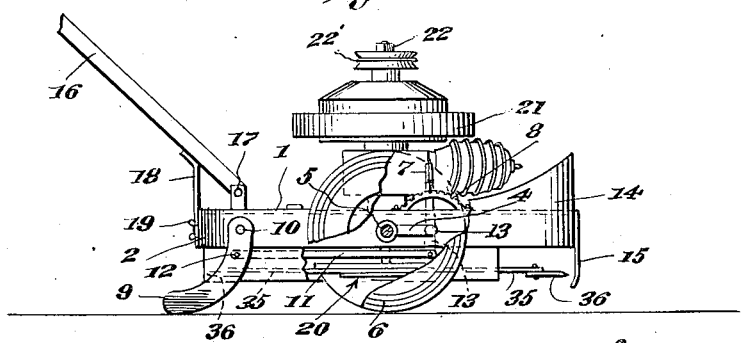
Figure 2 is a side elevation thereof.

This improved lawn mower has a frame or carriage 1 which may be formed of sheet metal or other suitable material and about its margins is secured a strip 2 forming a depending bordering flange. An axle 3 extends transversely of the carriage under the platform thereof with its end portions journalled through the depending flange and formed with arms 4 carrying spindles 5 for rotatably mounting wheels 6. A latch lever 7 extends upwardly from the shaft or axle through an opening in the platform and its latch engages the rack 8 so that after the shaft has been turned to swing the arms 5 vertically and adjust the position of the carriage, the shaft may be held against turning and the carriage retained in a set position. There have also been provided skids 9 for supporting the rear portion of the carriage. These skids are pivoted to the flange 2 at opposite sides of the carriage by pins 10 and in order to adjust the skids simultaneous with the axle or shaft 3 there have been provided rods or links 11 which have their rear ends pivoted to the skids below the flange 2, as shown at 12, and their front ends pivoted to the depending arms 13 carried by the shaft or axle 3. By this arrangement the skids will be swung to adjusted positions as the shaft is turned to shift the carriage vertically and the carriage will be maintained in a horizontal plane. A shield 14 which is formed of sheet metal is secured along the forward portion of the carriage and gradually decreases in height from its center towards its ends. This shield projects upwardly from the platform of the carriage and at its center carries a depending guard 15 which has its lower end spaced upwardly from the ground. A handle 16 by means of which the mower is propelled and guided is pivoted to the rear portion of the carriage, as shown at 17, and supported at a convenient incline by a prop 18 which is adjustably secured against the rear portion of the binding strip or flange 2 by a fastener 19 such as a bolt and winged nut. It will thus be seen that the handle may be tilted to an angle convenient for the person operating the mower and secured in the adjusted position.

Figures 6, 7:
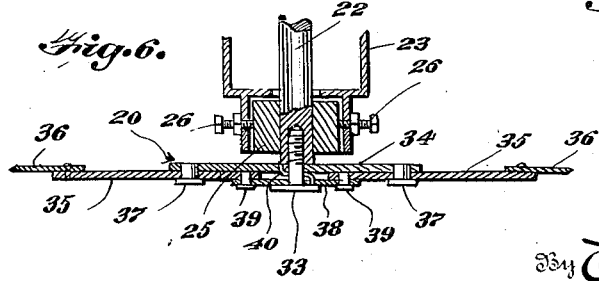
Figure 6 is a sectional view taken longitudinally through the cutter bar and its mounting.
Figure 7 is a fragmentary view showing a treadle-operated starting mechanism for the motor and a portion of the motor and a portion of the motor shaft in side elevation.

The cutter which is indicated in general by the numeral 20 is driven by a motor 21 which is mounted over the platform of the carriage and has its shaft 22 disposed vertically with its lower portion projecting downwardly through a well or channel 23 carrying a bearing housing 24 in which a bearing 25 is secured by set screws 26. A pulley 22' for engagement by a starting rope is at the upper end of shaft 22. If so desired the starter mechanism of Figure 7 may be used wherein a pinion 27 is carried by the shaft for engagement by a rack bar 28 which is slidably mounted in supports or guides 29 and connected with the guides 29 by a link 31; the guides 29 and treadle 30 are supported in any suitable manner upon frame 1. A spring 32 normally holds the pedal in the normal position shown in Figure 7 and when the treadle is depressed by foot pressure the rack will be shifted longitudinally and engaged with the pinion to rotate the imparting shaft for imparting a starting impulse on the motor.

The cutter 20 is connected with the lower end of the motor shaft 22 by a screw 33 and has a mounting bar 34 formed with a center opening through which the screw passes. Cutter bars 35 having triangular blades 36 at their outer ends are pivoted to the mounting bar 34 by pivot pins 37 and inner ends of the cutter bars are pivotally connected with an equalizer bar or plate 38 by pivot pins 39. This plate 38 is yieldably held in its normal position by a spring 40, and referring to Figures 3 and 5 it will be seen that normally the cutter bars and the equalizer bar or plate are in longitudinal alignment with each other. In case the blades encounter extra tough vegetation during operation of the mower, the cutter bars will be tilted about the pins 37 and since they are connected with the equalizer plate 38 by the pins 39 the cutter bars will be both moved the same extent and an even balance will be maintained during rotation of the motor shaft and the cutter. In case a blade 32 should strike a stone, tree root, or other obstruction, the cutter bars will be tilted about the pins 37 a sufficient distance for the blades to pass the obstruction without being damaged thereby. The fact that the blades have outwardly converging side edges provides cam edges which assist in causing the cutter bars to be swung transversely when the blades encounter tough grass or rocks. After the blades have cut their way through the tough grass or passed over a rock the spring 40 returns the equalizer plates and the cutter bars to a position in alignment with each other.

In Figure 8 there has been shown a cutting mechanism of a modified construction. In this embodiment of the invention the cutter bars 41 which take the place of the cutter bars 35 have their outer ends formed with blades 42 and their inner ends pivoted to the mounting bar 34 by pins 43 so that the cutter bars may turn about the same. The inner ends of the cutter bars have arcuate edges which are toothed to form gear segments 44 which mesh with a gear or pinion 45 carried by the screw 33 and it will be readily understood that when one cutter bar is turned about its pivot 43 the other cutter bar will be simultaneously turned and a proper balance maintained. The spring 46 yieldably holds the gear 45 against turning and normally maintains the cutter bars in longitudinal alignment with each other.

When this mower is in use it is moved to the place of use by its handle 16 and the motor started either by a rope wound about pulley 22' and pulled or by applying pressure to the treadle and then releasing the treadle so that the spring 32 returns it to its normal position. As the rack bar 28 is shifted longitudinally rotary motion is imparted to the engine shaft and the engine will be started. The mower is then propelled across a lawn to be mowed and since the cutter turns rapidly with the engine shaft the blades at ends of the cutter will cut the grass. By adjusting the lever 7 the axle may be turned to raise or lower the carriage and the grass cut as close to the ground as desired. The fact that the skids are moved with the axle causes the carriage to be at all times held in a horizontal plane and the grass will be properly cut. The shield 14 prevents tall grass from falling upon the front portion of the carriage and the guard finger 15 protects the blades of the cutter from being damaged by striking large rocks, tree roots and the like.

While I have illustrated and described the preferred embodiments of my invention, certain changes or alterations may appear to one skilled in the art to which the invention relates, and I, therefore, reserve the right to make such changes or alterations in construction which come within the scope of the appended claims.

Having thus described the invention, what is claimed is:

1. In a lawn mower, a carriage, an axle extending transversely of the carriage and rotatably mounted for rocking adjustment, arms at ends of the axle provided with outstanding spindles, supporting wheels carried by said spindles, skids pivoted to said carriage and extending downwardly therefrom, links pivoted to said skids, arms depending from said axle and pivoted to said links, a latch lever for turning the axle and effecting shifting of the carriage vertically to an adjusted position, a motor carried by said carriage and having its shaft disposed vertically, and cutter mechanism carried by the motor shaft and turning therewith in a substantially horizontally plane under the carriage.

2. In a lawn mower, a carriage, an axle rockably carried by said carriage and having arms at its ends provided with outstanding spindles, wheels upon said spindles, skids pivoted to the carriage and depending therefrom, means connecting the skids with the axle and tilting the skids to adjusted positions when the axle is rocked to vertically adjust the carriage, means for rocking the axle and securing the same in an adjusted position, a motor carried by said carriage and cutting means actuated by said motor.

3. In a lawn mower, a portable carriage, a motor carried by said carriage and having its shaft disposed vertically with its lower portion projecting downwardly from the carriage, and a cutter carried by the lower portion of said motor shaft consisting of a mounting bar fixed to the motor shaft and projecting from opposite sides thereof, cutter bars pivoted to end portions of the mounting bar and extending longitudinally therefrom, blades at ends of the cutter bars, a movable connection between inner ends of the cutter bars, and means yieldable holding the connection in a normal position with the cutter bars in longitudinal alignment with each other.

4. In a lawn mower, a portable carriage, a motor carried by said carriage with its shaft disposed vertically, and a cutter carried by the lower portion of the motor shaft and consisting of a mounting fixed to the motor shaft, cutter bars pivoted to said mounting and projecting therefrom in opposite directions, blades at outer ends of the cutter bars, an equalizing plate pivotally mounted between inner ends of the cutter bars and movably connected therewith, and a spring yieldably holding the equalizer plate in a normal position with the cutter bars in longitudinal alignment with each other.

5. In a lawn mower, a portable carriage, a motor carried by said carriage with its shaft disposed vertically, a mounting, a screw securing the mounting to the lower end of the motor shaft, cutter bars pivoted to the mounting and having blades at their outer ends, an equalizer plate loose about said screw and pivotally connected with inner ends of the cutter bars, and a spring about the screw engaged with the mounting and the equalizer and yieldably holding the equalizer in a normal position with the cutter bars in longitudinal alignment with each other.

6. In a lawn mower, a carriage, a motor carried thereby with its shaft disposed vertically, and a cutter carried by and turning with said shaft and consisting of a mounting, a screw securing the mounting to the lower end of the shaft, a pinion loose about the screw, cutter bars pivoted to said mounting and extending from the same, said cutter bars having gear members at their inner ends meshing with the pinion for transmitting pivotal movement of one bar to the other, and a spring about said screw yieldably holding the pinion against turning movement and normally holding the cutter bars in longitudinal alignment with each other.

JAMES ARTHUR SWAN.